Aug. 30, 1927.  
R. L. BLANCHARD  
1,640,921  
AIR INDICATING AND REGULATING APPARATUS FOR FURNACES  
Filed June 13, 1925  
2 Sheets-Sheet 1
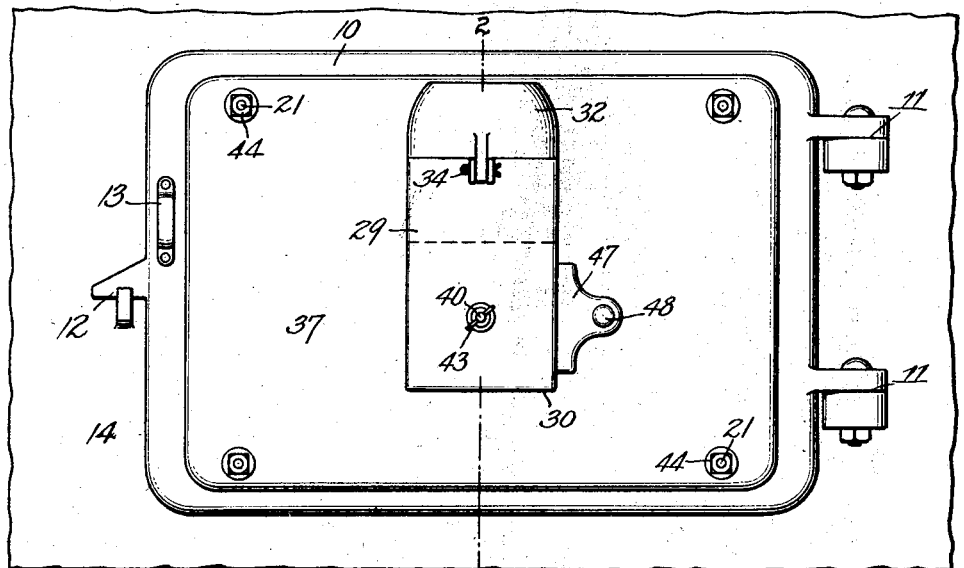
Fig. 1.
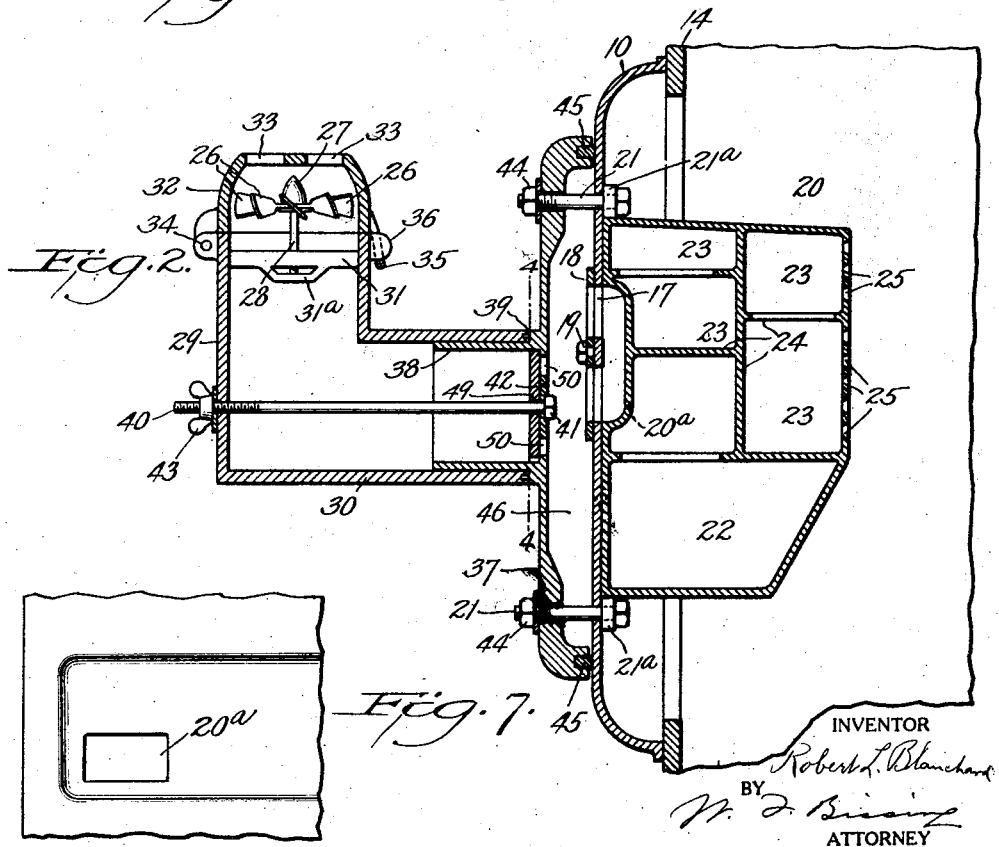
Fig. 2.
Fig. 7.
INVENTOR
Robert L. Blanchard
BY
ATTORNEY Aug. 30, 1927.
R. L. BLANCHARD
1,640,921
AIR INDICATING AND REGULATING APPARATUS FOR FURNACES
Filed June 13, 1925  2 Sheets-Sheet 2
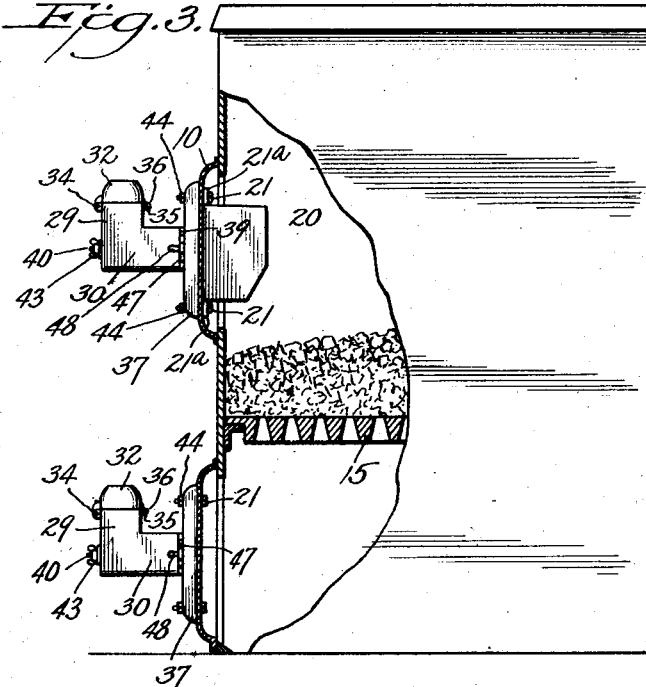
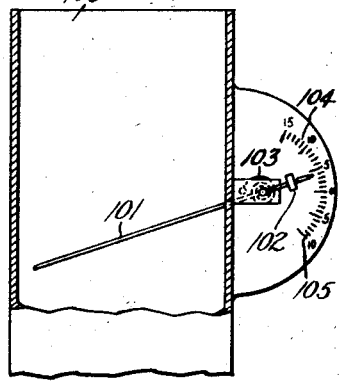
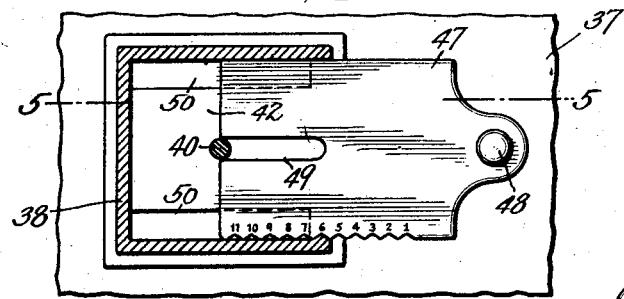
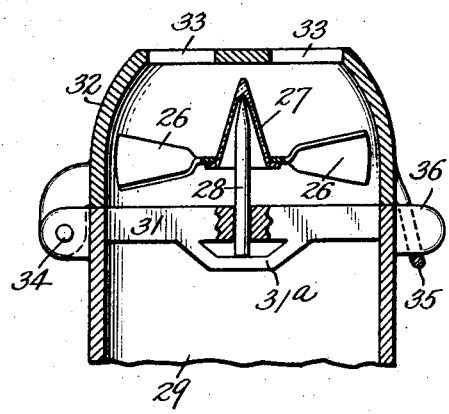
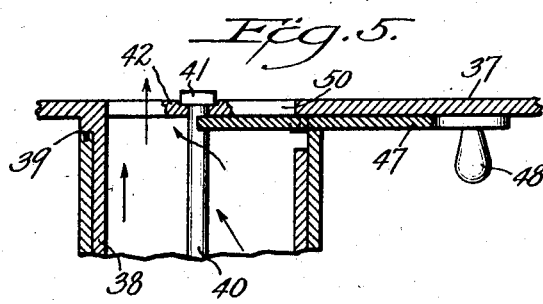
INVENTOR
Robert L. Blanchard
BY
ATTORNEY Patented Aug. 30, 1927.

1,640,921

UNITED STATES PATENT OFFICE.

ROBERT L. BLANCHARD, OF NEW YORK, N. Y.

AIR INDICATING AND REGULATING APPARATUS FOR FURNACES.

Application filed June 13, 1925. Serial No. 36,926.

My invention relates to a means for indicating and regulating the amount of air that is being supplied to a furnace and more particularly to a draft indicating and regulating attachment secured in air draft relation to the opening in the furnace door so that the amount of air passing into the furnace, above the fuel bed, may be determined and regulated.

One of the objects of the invention is to provide a means whereby the proper amount of air may be introduced over the fire.

Another object of the invention is to provide an indicator which shows the direction of flow of air thru the furnace door into the furnace.

In the best embodiment of the invention, the draft indicator is mounted on the outside of the door and an air preheater and retarder is mounted on the inside of the door, the draft indicator providing substantially no retardation to the air flow but indicating the amount of such flow thru the air preheater and retarder.

In accordance with the invention, the adjuster valve is provided with a scale and the number of revolutions per minute of the indicator is noted for any given rate area and position of the valve, so that with a certain number of revolutions per minute of the indicator for a given grate area, the amount of air passing by the indicator and over the fuel bed, is indicated. The actual amount or volume of air so supplied may be determined by a suitable measuring instrument and is also known from practical experience. The draft indicator may thus be calibrated.

With the above and other objects in view, my invention consists in the parts, improvements and combinations more fully pointed out hereinafter.

Turning now to the drawings, which illustrate one embodiment of the invention:

Figure 1, is a front elevation, showing the draft indicator secured to the furnace door.

Figure 2, is a longitudinal section on line 2—2 of Figure 1.

Figure 3, is an elevation, partly in section, showing one draft indicator secured to the furnace door and another such indicator secured to the ashpit door.

Figure 4, is a sectional detail illustrating an enlarged view of the regulating slide.

Figure 5, is a transverse section on line 5—5 of Figure 4.

Figure 6, is an enlarged vertical sectional view, showing the revolving vanes of the indicator.

Figure 7, shows the air opening into the air preheater and retarder, and

Figure 8, is an elevation partly in section, of another form of indicator.

In the drawings, the furnace door 10, which closes the fuel opening of the furnace, is hinged at 11, and is provided with a door catch 12, and handle 13, and is mounted on the frame 14, of the furnace, which has a grate 15, and damper 16. The door tightly fits the frame and is sealed to prevent air leakage. The door is provided with a main air draft, which, in the preferred embodiment of the invention, takes the form of an air-draft opening 17, which may be opened more or less, or closed by a damper 18, pivoted at 19, upon the door. Thru this main draft substantially all the air is supplied to the portion of the furnace behind the door.

In the best embodiment of the invention, an air preheating, air-retarding and air-distribution chamber 20, is secured to the inside of the door by bolts 21, which pass thru ears 21$^a$ of the chamber, the air chamber being provided with an inlet opening 20$^a$, a reservoir 22, and channels 23, formed by transverse partitions 24, communicating in series with each other (see Brunner Patent No. 1,433,601, of October 31, 1922). The air entering thru draft opening 17, passes into opening 20$^a$ and reservoir 22, and then back and forth along the stretch of passageways in series, in a serpentine path, finally discharging over the fuel bed thru openings 25. This introduces a draft resistance to the air and permits its preheating so that the draft over the fuel bed and the draft from beneath the fuel bed are balanced and equalized, and distributes the air over the fuel bed. Accordingly one half of the air for complete combustion is supplied thru the grate, the other half being supplied over the fuel bed. The draft is regulated by damper 16.

Turning now to the air-draft indicator, suitable means are provided such as an air vane, for indicating the flow of air thru the opening in the furnace door, means being also provided for securing the air vane into air-draft relation with the opening. The form of air vane may be varied. In the embodiment of the invention illustrated in Figures 2 and 6, a rotary vane is utilized.

As illustrated, a plurality of floating air vanes 26 (whose inclination determines their speed of rotation), are mounted upon a carrier 27, the carrier resting upon a supporting pin 28. An elbow pipe having two arms 29 and 30, is provided, the supporting pin for the air vanes being mounted on a vertical axis in the distant arm and the other arm being provided with means for securing the pipe to the furnace door. Means are thus provided for securing the air vanes into air draft relation with the opening in the furnace door. The supporting pin 28, is removably mounted on and carried by a traverse piece 31, which is fixed in one arm of the elbow. Its inward projection is limited by a stop, such as strap 31ª. A cap 32, provided with air openings 33, for directing the air to the vane, is mounted upon the elbow arm, being preferably pivoted at 34, and carrying a bail 35, which can be pushed under the lug 36, to clamp the cap down in place. When the cap is swung up, the vanes may be removed. In the form of the invention illustrated, the means for securing the elbow pipe to the furnace door, includes a plate 37, upon which the elbow pipe is mounted. The plate carries a short tube 38, preferably cast integral with it, over which the arm 30 of the elbow is slipped. The joint 39, prevents leakage. A bolt 40, having a head 41, the latter passing behind the crosspiece 42, on the plate 37, locks the elbow on the plate, the bolt passing thru an arm of the elbow and carrying a thumb nut 43.

Means are provided for securing the plate 37, to the door. As illustrated, the bolts 21, which secure the air chamber 20 to the inside of the door, serve to secure the plate to the outside of the door, the bolts carrying nuts 44.

The plate 37, is provided with a rim joint 45, which seals the plate and prevents leakage, the rim being bent so as to separate the plate from the furnace door and provide an air chamber 46. This air chamber is in registering relation with the opening 17, in the door.

In the form of air vane indicator shown in Figure 8, the elbow pipe arm 100, carries a pivoted vane 101, which may extend horizontally across the interior of the pipe and is counterbalanced by adjustable weight 102 and is held in vane closing position by coiled spring 103. It is shown deflected by the passage of air. Two scales 104, 105, show the displacement of the vane on opposite sides of closing position, scale 104, showing the effect due to the incoming air and scale 105, showing the reverse action when gas is generated, by closed dampers, in the fuel bed and streams outwardly thru the pipe.

In accordance with the invention the volume of air passing over the fuel bed is measured and determined and the amount of air so supplied is controlled until a predetermined standard of supply, has been obtained.

Means are provided cooperating with the vane indicator for regulating the amount of air which passes by the indicator into the door opening. In this way the amount of air flow can be regulated so as to secure a fine adjustment of the flow with relation to the size and kind of air retarding chamber that is employed and the size of the furnace grate in conjunction with which it is used. When a valve such as 18, is provided for the door opening, it is locked in open position. The air regulating means includes a valve 47, which in the best embodiment of the invention, is mounted on the plate 37. This valve is preferably a slide valve provided with a handle 48, and slot 49, which fits over bolt 40. The valve is provided with a numbered scale and varies the opening of the ports 50 in the plate 37.

The cross-section of the elbow pipe when reduced by the space taken up by the air vanes and their support, is greater than that of the ports controlled by the slide valve and the area of the opening 17, in the furnace door is greater than the cross-section of the elbow pipe, the area of the inlet opening 20ª, into the heating and retarding chamber 20, being less than the cross-section of the elbow pipe and less than the area of the air openings in the cap. In this way, the elbow pipe and its air vanes offer no substantial increased resistance to the passage of the air thru the air chamber 20, and the slide valve can serve as a regulating valve when desired.

The valve or adjuster slide being provided with a numbered scale and observations of the revolutions per minute of the indicator vane for any given grate area being noted, this will enable a table of standards to be prepared. For a definite grate area, and a specified kind of coal, there should be a specified amount of air delivered over the fire and a certain number of revolutions per minute of the indicator vane will indicate this condition. The adjuster slide can be regulated until this desired condition is obtained and for definite grate areas it will be found that the adjuster slide will assume different positions which by reason of the numbered scale thereon, can be recorded and the table of standards for definite grate areas thereby established. At the same time, by means of a suitable measuring instrument or from practical experience, the amount or volume of air supplied thru the elbow pipe may be ascertained.

While the above can be accomplished with but one size of vane and inlet pipe, the construction of this table of standards will be simplified by the use of two or more sizes of vanes and inlet pipes. The use of different coal also enters into and modifies this table.

In practical use the adjuster slide can be set at a predetermined position, according to the grate area and coal used. A failure of the indicator to indicate a normal number of revolutions per minute, would indicate faulty draft conditions such as clogged stack or chimney, openings in stack or chimney, leaks between sections of the chimney pipe, etc. If with dampers and fuel bed in normal condition, the indicator vane did not indicate a normal number of revolutions per minute, the increase or decrease from normal would indicate the adjustment required. If the number of revolutions per minute is above normal, proper regulation of dampers could be determined and if with the dampers closed the vane still revolved defective damper conditions would at once be indicated and the remedy could be effected as the case might require. When drafts are reduced for purposes of holding fires as for night runs, if the vane comes to a standstill and then reverses, running in counterclockwise direction, this serves to indicate a too severe checking of the draft and the back flow of coal gas into the cellar and building. The slight adjustment of dampers until the vane stops or revolves slowing in clockwise direction insures safety and the carrying out by the stack of the gases generated.

With particular reference to supplying about one-half the total air above the grate and the other half through the fuel bed, it is to be noted that the installation of a vane of the same size carried on an inlet pipe of the same size, mounted on the ashpit door, as shown in Figure 3, will permit of positive adjustment since with the adjuster slide on the vane connected with the pipe introducing air over the fire, adjustment can be made rendering the number of revolutions per minute of both vanes the same and hence the volume of air introduced over and under the fire, the same. Any variation of these percentages which specific coal or furnace conditions might warrant could likewise be readily obtained.

It will thus be observed that the indicator vane provides a permanent means for indicating draft and furnace conditions and any variations from normal can at once be noted and repairs made which defects if they develop without this means of calling attention thereto, might continue for an indefinite period to the disadvantage and lack of economy to the owner.

Having thus described the invention and its construction and operation, it will be understood that changes may be made in carrying the invention into effect without departing from the principle thereof.

What I claim is:

1. A draft indicating device for furnaces, which shows the direction of flow of air thru the furnace door into the furnace, comprising in combination with a furnace door having a main air draft opening thru which substantially all the air is supplied to the portion of the furnace behind the door, a pipe projecting from the furnace door, an air vane mounted in the projecting portion of said pipe, thereby bringing said air vane into air draft relation with said opening in the furnace door.

2. A draft indicating device for furnaces comprising in combination with the furnace having a combustion chamber provided with a main air draft, an elbow pipe projecting from the furnace, an air vane mounted in the distant arm of said pipe, on its vertical axis, and means for securing said pipe to said furnace so as to bring the pipe and the air vane mounted therein into air draft relation with the main air draft of the combustion chamber of the furnace, the air vane thus indicating the direction of flow of air into the combustion chamber.

3. A draft indicating device for furnaces, which shows the direction of flow of air thru the furnace door into the furnace, comprising in combination with a furnace door having a main air draft opening, thru which substantially all the air is supplied to the portion of the furnace behind the door, a projecting pipe, a floating, rotary air vane mounted in the projecting portion of said pipe, said air vane adapted to revolve in either direction, and means for securing said pipe to the furnace in draft relation to said main air draft opening.

4. A draft indicating device for furnaces, which shows the direction of flow or air thru the furnace door into the furnace, comprising in combination with a furnace door having a main air draft opening, an air chamber provided with a serpentine, air-retarding path mounted on the inside of the furnace door communicating with said main air draft opening, a floating air vane, an elbow pipe having two arms, means for securing the elbow pipe at the front of the said main air draft opening in the furnace door, and means for securing the air vane on a vertical axis in the distant arm of said elbow pipe.

5. A draft indicating device for furnaces, which shows the direction of flow of air thru the furnace door into the furnace, comprising in combination with a furnace door having a main air draft opening thru which substantially all the air is supplied to the portion of the furnace behind the door, an air chamber mounted on the inside of the furnace door in communication with the main air draft opening, an elbow pipe having two arms, a rotatable air vane mounted vertically on the distant arm of said pipe, a plate on which the elbow pipe is mounted and means for securing said plate to said furnace door in a position separated therefrom so as to provide an air chamber, thereby bringing said air vane and air chamber into air draft relation with the said opening in the furnace door.

6. A draft indicating device for furnaces, which shows the direction of flow of air thru the furnace door into the furnace, comprising in combination with the furnace door having a main air draft opening, an elbow pipe mounted adjacent to and in draft relation with said main draft opening in the distant arm of which pipe a floating air vane is mounted on a vertical axis, said arm provided with an air opening admitting air to the vane, a plate carrying said pipe and means for securing said plate to and away from said furnace door to form an air chamber between said plate and door.

7. A draft indicating device for furnaces, which shows the direction of flow of air thru the furnace door into the furnace, comprising in combination with the furnace door having a main draft opening, an elbow pipe mounted adjacent to and in draft relation with said main draft opening in the distant arm of which pipe an air vane is mounted, said arm provided with air openings admitting air to the vane, a plate carrying said pipe a bolt passing thru the other arm of said elbow for securing the elbow to said plate and means for securing the plate to said furnace door, thereby bringing said air vane into air-draft relation with the said opening in the furnace door.

8. A draft device which shows the direction of flow of air thru a furnace door into a furnace, comprising in combination with the furnace door having a main draft opening, valve regulating means for controlling the amount of air supplied thru the said opening in the furnace door above the fuel bed, a pipe carrying said valve regulating means, in air-draft relation with the said draft opening in the furnace door, mounted upon and projecting from the furnace door and an air vane indicator mounted in the projecting portion of said pipe for indicating the amount of air supplied.

In testimony whereof, I have signed my name to this specification.

ROBERT L. BLANCHARD.